US009020293B2

(12) United States Patent
Lo et al.

(10) Patent No.: US 9,020,293 B2
(45) Date of Patent: Apr. 28, 2015

(54) INTEGRATION OF FILTERS AND PHASE UNWRAPPING ALGORITHMS FOR REMOVING NOISE IN IMAGE RECONSTRUCTION

(75) Inventors: Yu-Lung Lo, Tainan (TW); Jing-Feng Weng, Tainan (TW)

(73) Assignee: National Cheung Kung University, Tainan (TW)

( * ) Notice: Subject to any disclaimer, the term of this patent is extended or adjusted under 35 U.S.C. 154(b) by 715 days.

(21) Appl. No.: 13/367,830

(22) Filed: Feb. 7, 2012

(65) Prior Publication Data

US 2013/0202181 A1 Aug. 8, 2013

(51) Int. Cl.
G06K 9/32 (2006.01)
G06K 9/40 (2006.01)
G06T 5/00 (2006.01)

(52) U.S. Cl.
CPC ....... G06T 5/002 (2013.01); G06T 2207/10028 (2013.01)

(58) Field of Classification Search
USPC .................................. 382/275, 300
See application file for complete search history.

(56) References Cited

U.S. PATENT DOCUMENTS

| 4,797,615 | A | | 1/1989 | Rotem et al. |
| 5,608,405 | A | * | 3/1997 | Pritt ............................ 342/25 C |
| 6,097,328 | A | | 8/2000 | Frankot |
| 6,208,416 | B1 | * | 3/2001 | Huntley et al. ............... 356/606 |
| 6,438,272 | B1 | * | 8/2002 | Huang et al. ................. 382/286 |
| 6,466,016 | B1 | | 10/2002 | Miyoshi |
| 6,639,685 | B1 | * | 10/2003 | Gu et al. ....................... 356/603 |
| 6,677,885 | B1 | | 1/2004 | Frankot |
| 6,775,006 | B2 | | 8/2004 | De Groot et al. |
| 7,605,925 | B1 | * | 10/2009 | Chen ............................. 356/511 |
| 2004/0027585 | A1 | | 2/2004 | De Groot |
| 2010/0150467 | A1 | * | 6/2010 | Zhao et al. .................... 382/264 |

OTHER PUBLICATIONS

Huntley, J.M., Noise-immune phase unwrapping algorithm, 1989, Applied Optics, vol. 28, No. 15, pp. 3269-3270.*
Marklund, O., An Anistropic Evolution Formulation Applied in 2-D Unwrapping of Discontinuous Phase Surfaces, 2001, IEEE Transactions on Image Processing, vol. 10, No. 11, pp. 1700-1711.*
Qian, F., Wang, X., Wang, X., and Bu. Y., Adaptive filter for unwrapping noisy phase image in phase-stepping interferometry, 2001, Optics & Laser Technology, vol. 33, pp. 479-486.*
Abdelfattah, Riadh., InSAR phase analysis: Phase unwrapping for noisy SAR interferograms. 2009, Intech, ISBN 978-953-307-005-6, pp. 419-440.*
Langley, J.A., Brice, R.G., and Zhao, Q., Recursive approach to the moment-based phase unwrapping method, 2010, Applied Optics, vol. 49, No. 16, pp. 3096-3101.*
Liu, J. and Drangova, M., Phase-Unwrapping Algorithm for Translation Extraction From Spherical Navigator Echoes, 2010, Magnetic Resonance in Medicine, Vo. 63, pp. 510-516.*

(Continued)

Primary Examiner — Wesley Tucker
(74) Attorney, Agent, or Firm — Mucy, Geissler, Olds & Lowe, P.C.

(57) ABSTRACT

A method to detect and remove noise in image reconstruction. The method includes integration of filters and phase unwrapping algorithms for removing speckle noise, residual noise and noise at the lateral surface of height discontinuities. The method is used for generating a noise-free unwrapped phase map and hence, a successful image reconstruction of an object image.

27 Claims, 13 Drawing Sheets

(56) References Cited

OTHER PUBLICATIONS

Xu, W., Chang, E.C., Kwoh, L.K., Lim, H., and Heng, W.C.A., Phase-unwrapping of SAR Interfereogram with Multi-frequency or Multi-baseline, 1994, Geoscience and Remote Sensing Symposium, vol. 2, pp. 730-732.*

Abbas Hasan Kattoush, "A Hilbert Transform N-Dimensional Noisy Phase Unwrapping Algorithm", Journal of Information and Computing Science, 2009, pp. 115-123, vol. 4, No. 2.

Andrew Hooper, et al., "Phase unwrapping in three dimensions with application to InSAR time series", J. Opt. Soc. Am A, Sep. 2007, pp. 2737-2747, vol. 24, No. 9.

Annalisa Capanni, et al., "Phase-shifting speckle interferometry: a noise reduction filter for phase unwrappung", Opt. Eng., Sep. 1997, pp. 2466-2472, vol. 36, No. 9.

Boris Marendic, et al., "Phase unwrapping using an extrapolation-projection algorithm", J. Opt. Soc. Am. A, Aug. 2006, pp. 1846-1855, vol. 23, No. 8.

Bruno F. Pouet, et al., "Technique for the removal of speckle phase in electronic speckle interferometry", Optics Letters, Feb. 1, 1995, pp. 318-320, vol. 20, No. 3.

Dalip Singh Mehta, et al., "Simple multifrequency and phase-shifting fringe-projection system based on two-wavelength lateral shearing interferometry for three dimensional profilometry", Applied Optics, Dec. 10, 2005, pp. 7515-7521, vol. 44, No. 35.

Dennis C. Ghiglia, et al., "Cellular-automata method for phase unwrapping", J. Opt. Soc. Am. A, Jan. 1987, pp. 267-280, vol. 4, No. 1.

H.Y. Chang, et al., "The Tapestry Cellular Automata phase unwrapping algorithm for interferogram analysis", Optics and Lasers in Engineering, 1998, pp. 487-502, vol. 30.

Hubert A. Aebischer, et al., "A simple and effective method for filtering speckle-interferometric phase fringe patterns", Optics Communications, Apr. 15, 1999. pp. 25-210, vol. 162.

Inkyu Moon, et al., "Three-dimensional speckle-noise reduction by using coherent integral imaging", Optical Letters, Apr. 15, 2009, p. 1246-1248, vol. 34, No. 8.

Jing-Feng Weng, et al., "Robust detection scheme on noise and phase jump for phase maps of objects with height discontinuities-theory and experiment", Optics Express, Feb. 14, 2011, 3086-3105, vol. 19, No. 4.

Kai Liu, et al., "Dual-frequency pattern scheme for high-speed 3-D shape measurement", Optical Express, Mar. 1, 2010, pp. 5229-5244, vol. 18, No. 5.

M.J. Huang, "On the Phase Unwrapping of Speckle Interferometry Maps", SEM X International Congress & Exposition on Experimental & Applied Mechanics, Jun. 7-10, 2004, 9 pages, http://www.sem.org/Proceedings/ConferencePapers-Paper.cfm?ConfPapersPaperID=24737.

M.J. Huang, et al., "Retrieving ESPI Map of Discontinuous Objects via a Novel Phase Unwrapping Algorithm", Strain, 2008, pp. 239-247, vol. 44.

Oscar S. Dalmau-Cedeno, et al., "Fast phase recovery from a single closed-fringe pattern", J. Opt. Soc. Am. A, Jun. 2008, pp. 1361-1370, vol. 25, No. 6.

Ryo yamaki, et al., "Singularity-Spreading Phase Unwrapping", IEEE Transaction on Geoscience and Remote Sensing, Oct. 2007, pp. 3240-3251, vol. 45, No. 10.

Shi Yuqing, "Robust phase unwrapping by spinning iteration", Optics Express, Jun. 25, 2007. pages 8059-8064, vol. 15, No. 13.

Song Zhang, et al., "Multilevel quality-guided phase unwrapping algorithm for real-time three-dimensional shape reconstruction", Applied Optics, Jan. 1, 2007, pp. 50-57, vol. 46, No. 1.

William W. Macy, Jr., "Two-dimensional fringe-pattern analysis", Applied Optics, Dec. 1, 1983, pp. 3898-3901, vol. 22, No. 23.

Zhenhua Huang, et al., "Phase unwrapping for large depth-of-field 3D laser holographic interferometry measurement of laterally discontinuous surface", Measurement Science and Technology, 2006, pp. 3110-3119, vol. 17.

* cited by examiner

INTEGRATION OF FILTERS AND PHASE UNWRAPPING ALGORITHMS FOR REMOVING NOISE IN IMAGE RECONSTRUCTION

FIELD

Exemplary embodiments relate to image reconstruction, and, more particularly, to a method for noise detection and removal in image reconstruction of objects.

BACKGROUND

Image reconstruction is a related art technique that encompasses the entire image formation process and provides a foundation for the subsequent steps of image processing. Image reconstruction retrieves image information that has been lost during the process of image formation. In related art optical interference imaging techniques, interferograms of an object are converted into a wrapped phase map containing phase values in the range 0~2π using a phase-shift algorithm. Three types of noise influence image reconstruction: residual noise, speckle noise, and noise at the lateral surface of height discontinuities. Speckle noise is usually generated due to the laser source. Residual noise is induced by environmental effects or contamination of the optical system.

The depth of field limit and the diffraction limit influence the optical measurement range, especially for microscope interferometers. For the object containing height discontinuities, the interferograms of the object will blur when the height of the object is out of the depth of field. In the depth of field, the position of height discontinuities creates difficulties in generating clear interferograms. Therefore, the blur of the interferograms at the height discontinuities will be converted into the noise in the wrapped phase map.

The wrapped phase maps are unwrapped by phase unwrapping algorithms. The phase unwrapping algorithms are classified as temporal, spatial and period-coding. Furthermore, the spatial phase unwrapping algorithms are classified as path-dependent algorithms (for example, MACY algorithm) and path-independent algorithms (for example, CA (cellular automata) algorithm). In the MACY algorithm, the phase unwrapping process is performed separately in row- and column-directions, respectively. The MACY is path-dependent and may suffer a disadvantage in that the unwrapping error caused by noise is accumulated progressively. Further, after its application, noise still exists at the lateral surface of height discontinuities. The CA algorithm accomplishes phase unwrapping using a multi-level iterative approach comprising both global and local cycles, known as global iteration and local iteration. Moreover, CA is path-independent, and thus the phase unwrapping errors caused by noise are not accumulated during the phase unwrapping procedure. However, its suffers from the disadvantage in that it is time consuming and the noise at the lateral surface of height discontinuities causes the CA algorithm to fail to seek the useful unwrapping paths.

When interferograms containing speckle noise are filtered by a linear filter, the whole images of interferograms are smeared to remove the speckle noise. Thus, the edges of the 2π phase jumps converted from interferograms are smoothed as shown in FIG. 2(b). Moreover, the noise at the lateral surface of height discontinuities is too turbulent, so the linear filter may not work effectively. Since the noise at the lateral surface is not removed clearly by the linear filter, the noise may cause phase unwrapping result of MACY and CA algorithms to fail.

These related art methods are not capable of removing all three noises: residual noise, speckle noise, and noise at the lateral surface of height discontinuities.

Thus, there is an unmet need for a method for detection and removal of noise in image reconstruction.

SUMMARY

Aspects of the exemplary embodiments relate to detection and removal of noise in image reconstruction.

It is an object of the exemplary embodiments to remove speckle noise, residual noise and noise at lateral surface of height discontinuities in image reconstruction.

It is another object of the exemplary embodiments to apply filtering operations to avoid smearing of edges of phase jumps.

It is still another object of the exemplary embodiments to apply phase unwrapping algorithms to enable unwrapping path to cross positions of noise, especially, at height discontinuities.

It is still another object of the exemplary embodiments to provide a method for generating a noise-removed unwrapped phase map. The method includes generating interferograms of an object image; generating a wrapped phase map of the object image from the interferograms by application of a phase-shift algorithm; detecting speckle noise, residual noise and noise at lateral surface of height discontinuities and filtering most of the speckle noise and the residual noise from the wrapped phase map by a first filter to obtain a noise-reduced wrapped phase map; unwrapping the noise-reduced wrapped phase map in row direction by a path-dependent phase unwrapping algorithm; filtering phase map obtained from application in the row direction of the path-dependent phase unwrapping algorithm by a second filter; unwrapping phase map obtained from the second filter in column direction by the path-dependent phase unwrapping algorithm; filtering phase map obtained from application in the column direction of the path-dependent phase unwrapping algorithm by a third filter to obtain a noise-removed unwrapped phase map.

It is still another object of the exemplary embodiments to provide another method for generating a noise-removed unwrapped phase map. The method includes generating interferograms of an object image; generating a wrapped phase map of the object image from the interferograms by application of a phase-shift algorithm; detecting speckle noise, residual noise and noise at lateral surface of height discontinuities and filtering most of the speckle noise and the residual noise from the wrapped phase map by a first filter to obtain a noise-reduced wrapped phase map; unwrapping the noise-reduced wrapped phase map by a path-independent phase unwrapping algorithm using cycles of local and global iterations, wherein a second filter is used repeatedly after each cycle of the local and global iterations; filtering phase map obtained after completion of the cycles by a third filter to obtain a noise-removed unwrapped phase map.

It is still another object of the exemplary embodiments to provide yet another method for generating a noise-removed unwrapped phase map. The method includes generating interferograms of an object image; generating a wrapped phase map of the object image from the interferograms by application of a phase-shift algorithm; detecting speckle noise, residual noise and noise at lateral surface of height discontinuities and filtering most of the speckle noise and the residual noise from the wrapped phase map by a first filter to obtain a noise-reduced wrapped phase map; cutting the noise-reduced wrapped phase map into several sub-maps and adding an additional area to each of the sub-maps; unwrapping sub-maps obtained by adding the additional area to the sub-maps by a path-independent phase unwrapping algorithm using cycles of local and global iterations, wherein a second filter is used repeatedly after each cycle of the local and global iterations; stitching together phase unwrapped sub-maps obtained by unwrapping of the sub-maps after completion of the cycles; and filtering phase map obtained after stitching together the phase unwrapped sub-maps by a third filter to obtain a noise-removed unwrapped phase map.

DETAILED DESCRIPTION

Disclosed herein is a method that will aid in the detection and removal of speckle noise, residual noise and noise at lateral surface of height discontinuities in image reconstruction. Numerous specific details are provided such as examples of components and/or mechanisms to provide a thorough understanding of the various exemplary embodiments. One skilled in the relevant art will recognize however, that an exemplary embodiment can be practiced without one or more of the specific details, or with other apparatus, systems, assemblies, methods, components, materials, parts, and/or the like. In other instances, well-known structures, materials or operations are not specifically shown or described in detail to avoid obscuring aspects of exemplary embodiments and for the sake of clarity.

Figure 1:
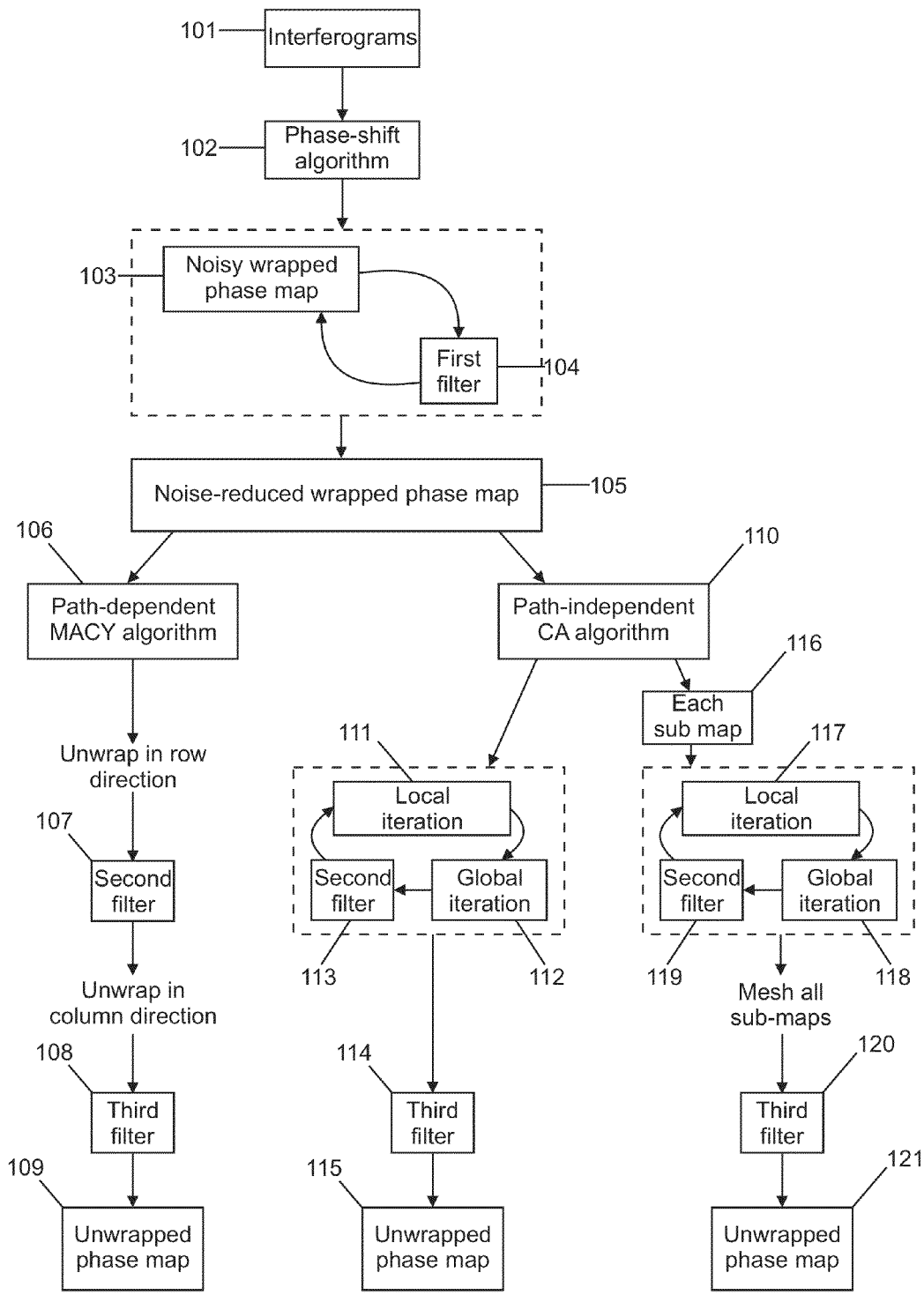
FIG. 1 illustrates a flow chart for image reconstruction in accordance with an exemplary embodiment.

FIG. 1 illustrates a flow chart for image reconstruction in accordance with an exemplary embodiment. The flowchart includes interferograms 101, a phase-shift algorithm 102, a wrapped phase map 103 containing speckle noise, residual noise and lateral surface noise at the points of height discontinuities, a first filter 104, a noise-reduced wrapped phase map 105, a path-dependent MACY algorithm 106, a second filter (107,113 and 119), a third filter (108, 114 and 120), an unwrapped phase map (109,115 and 121) a path-independent CA algorithm 110, a local iteration (111,117), a global iteration (112,118) and a sub-map 116.

The interferograms 101 of an object image are converted into the wrapped phase map 103 containing phase values in the range 0~2π by the phase-shift algorithm 102.

In an exemplary embodiment, the phase-shift algorithm 102 is a five-frame phase-shift algorithm. However, other algorithms may be substituted therefor, as would be understood by those skilled in the art, such as (but not limited to) three-frame phase-shift algorithm, four-frame phase-shift algorithm, Cane' algorithm and other phase-shifting algorithms.

The wrapped phase map 103 contains speckle noise, residual noise and noise at the lateral surface of height discontinuities. The first filter 104 is an adaptive median filter based on a noise and phase detection scheme which detects speckle noise, residual noise and noise at lateral surface of height discontinuities and filters most of the speckle noise and the residual noise from the wrapped phase map 103.

After filtering the wrapped phase map 103 by the first filter 104, the noise-reduced wrapped phase map 105 is obtained. Subsequently, either of three paths are followed to generate the unwrapped phase map (109,115 and 121): a first path (Path I) which involves the application of the path-dependent MACY algorithm 106, the second filter 107 and the third filter 108 to generate the unwrapped phase map 109; a second path (Path II) which involves the application of the path-independent CA algorithm 110, the second filter 113, the local iteration 111, the global iteration 112 and the third filter 114 to generate the unwrapped phase map 115; a third path (Path III) which involves the application of the path-independent CA algorithm 110, the second filter 119, She local iteration 117, the global iteration 118 and the third filter 120 to generate the unwrapped phase map 121. All the three paths have been explained in detail later in the description.

Figure 2A:
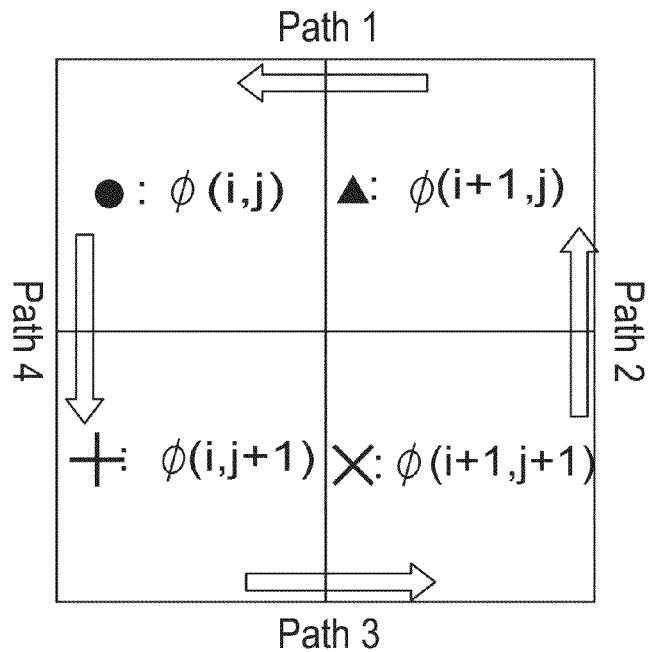
FIG. 2(a) is a graph showing the top view of four neighboring pixels of the wrapped phase map containing speckle noise, residual noise and lateral surface noise at the points of height discontinuities.
Figure 2B:
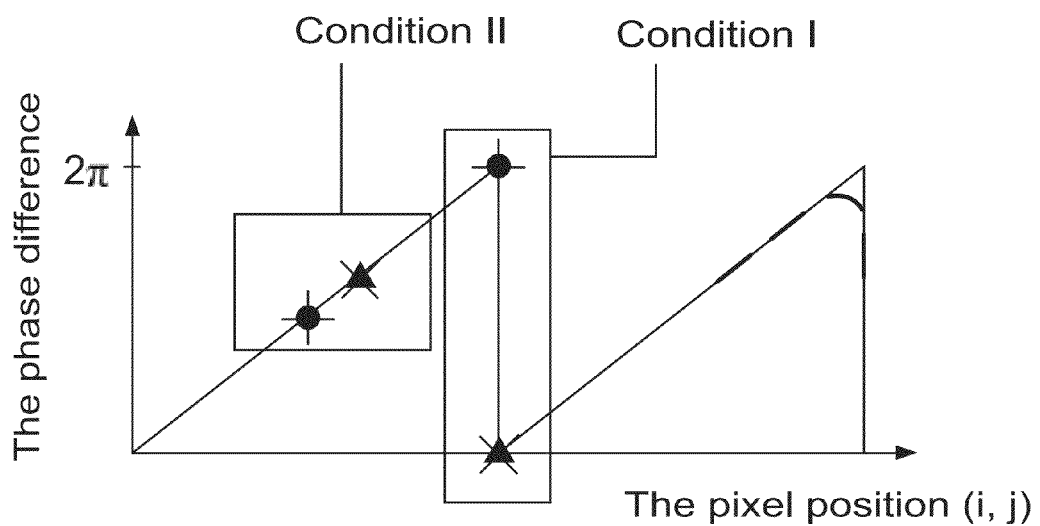
FIG. 2(b) is a graph showing the frontal view of the three-dimensional (3D) phase map corresponding to the wrapped phase map containing speckle noise, residual noise and lateral surface noise at the points of height discontinuities.

FIG. 2(*a*) shows the top view of four neighboring pixels of the wrapped phase map 103. Symbols ●, ▲, ×, and + indicate the phase values of corresponding pixels. FIG. 2(*b*) shows a frontal view of the three-dimensional (3D) view of the wrapped phase map 103. In the adaptive median filter, a 5×5 mask has five different positions relative to a phase jump, namely, far from a phase jump, close to a phase jump to a higher phase region, close to a phase jump to a lower phase region, straddling a phase jump to a higher phase region, and straddling a phase jump to a lower phase region. The wrapped phase data interval $[0, 2\pi]$ is divided into three equal subintervals. According to the number of mask pixels at the three subintervals, the mask corrects one of the five positions relative to a phase jump. Then, the median phase value of the mask-center position is calculated based on the five positions and weighted parameters. Finally, at the center-position of the mask, the phase value of good pixels remains the original value and the phase value of bad pixel is replaced by the median phase value.

With the weighted parameter values assigned to $\beta=1$ and $\gamma=0.7$, the phase value of the central pixel in the 5×5 mask is replaced by the corresponding expected phase value when the mask contains fewer than G good pixels, expressed as $N_{good\ pixels} \leq G$, where $N_{good\ pixels}$ is the number of good pixels in the 5×5 mask and G is a positive integer. In the 5×5 mask, if the 25 pixels contain fewer than 20 good pixels, the phase value of the center pixel is judged to be bad and is replaced by the corresponding expected phase value.

The difference between the phase data of a good pixel and its expected phase value is defined by the parameter $\sigma_g$, which is assigned a value of 0.05. If the difference between the actual phase value of a supposedly good pixel and its expected phase value is greater than the value assigned to, the phase value of the good pixel is simply replaced with the corresponding expected phase value.

The noise and phase detection method as disclosed in the present invention has four forms i.e. comparative phase parameters as:

$$S1(i, j) = \left[\frac{\phi(i+1, j) - \phi(i, j) - \sigma_A}{2\pi}\right] + \left[\frac{\phi(i+1, j+1) - \phi(i+1, j) + \sigma_A}{2\pi}\right] + \left[\frac{\phi(i, j+1) - \phi(i+1, j+1) - \sigma_A}{2\pi}\right] + \left[\frac{\phi(i, j) - \phi(i, j+1) + \sigma_A}{2\pi}\right] \quad (1)$$

$$S2(i, j) = \left[\frac{\phi(i+1, j) - \phi(i, j) + \sigma_A}{2\pi}\right] + \left[\frac{\phi(i+1, j+1) - \phi(i+1, j) + \sigma_A}{2\pi}\right] + \left[\frac{\phi(i, j+1) - \phi(i+1, j+1) + \sigma_A}{2\pi}\right] + \left[\frac{\phi(i, j) - \phi(i, j+1) - \sigma_A}{2\pi}\right]$$

$$S3(i, j) = \left[\frac{\phi(i+1, j) - \phi(i, j) + \sigma_A}{2\pi}\right] + \left[\frac{\phi(i+1, j+1) - \phi(i+1, j) + \sigma_A}{2\pi}\right] + \left[\frac{\phi(i, j+1) - \phi(i+1, j+1) - \sigma_A}{2\pi}\right] + \left[\frac{\phi(i, j) - \phi(i, j+1) - \sigma_A}{2\pi}\right]$$

$$S4(i, j) = \left[\frac{\phi(i+1, j) - \phi(i, j) - \sigma_A}{2\pi}\right] + \left[\frac{\phi(i+1, j+1) - \phi(i+1, j) - \sigma_A}{2\pi}\right] + \left[\frac{\phi(i, j+1) - \phi(i+1, j+1) + \sigma_A}{2\pi}\right] + \left[\frac{\phi(i, j) - \phi(i, j+1) + \sigma_A}{2\pi}\right]$$

Where (i, j) is the pixel position; $\phi$ is the corresponding phase value in the wrapped phase map 103; [ ] indicates a rounding operation; and $\sigma_2$ is the noise and phase jump detection threshold parameter. The parameter S1 in Eq. (1) uses four terms to calculate the phase difference between two neighboring pixels. The first term, i.e.

$$\left[\frac{\phi(i+1, j) - \phi(i, j) - \sigma_A}{2\pi}\right],$$

is defined as Path 1, the second term, i.e.

$$\left[\frac{\phi(i+1, j+1) - \phi(i+1, j) + \sigma_A}{2\pi}\right]$$

is defined as Path 2. Similarly, $$\left[\frac{\phi(i, j+1) - \phi(i+1, j+1) - \sigma_A}{2\pi}\right]$$

is defined as Path 3, while $$\left[\frac{\phi(i, j) - \phi(i, j+1) + \sigma_A}{2\pi}\right]$$

is defined as Path 4. As shown in FIG. 2(*a*), each path is composed of the phase difference between two neighboring pixels and Paths 1, 2, 3 and 4 of S1 are defined in the counterclockwise direction. Similarly, Paths 1, 2, 3 and 4 in parameters S2~S4 in Eq. (1) are also defined in the counterclockwise direction. As shown in FIG. 2(*b*), the region of the phase difference map, close to the $2\pi$ phase jumps is defined as Condition I, while that away from the phase jumps is defined as Condition II. The particular characteristics of the two regions are mentioned in the following sub-sections. It is shown that the pixels in both conditions can be treated as continuous provided that the condition S1=S2=S3=S4=0 in Eq. (1) holds.

Characteristics of Condition I pixels: The ideal case in which the phase values of four neighboring pixels in the phase jump region of the wrapped phase map 103 are equal to $\phi(i,j)=2\pi$, $\phi(i+1,j)=0$, $\phi(i,j+1)=2\pi$, and $\phi(i+1,j+1)=0$, respectively is considered. Substituting these values into Eq. (1) gives $$S1(i, j) = \left[\frac{0 - 2\pi - \sigma_A}{2\pi}\right] + \left[\frac{0 - 0 + \sigma_A}{2\pi}\right] + \quad (2)$$

$$\left[\frac{2\pi - 0 - \sigma_A}{2\pi}\right] + \left[\frac{2\pi - 2\pi + \sigma_A}{2\pi}\right]$$

$$= 1 + \left[\frac{-\sigma_A}{2\pi}\right] + \left[\frac{\sigma_A}{2\pi}\right] + 1 + \left[\frac{-\sigma_A}{2\pi}\right] + \left[\frac{\sigma_A}{2\pi}\right]$$

$$= 0$$

As shown in Eq. (2), the sum of the four terms in S1 is equal to zero. Similarly, the sums of the four terms in S2, S3 and S4, respectively, are also equal to zero, i.e. S2(i, j)=S3(i, j)=S4(i, j)=0. Furthermore, the zero result obtained in Eq. (2) holds for any value of the threshold parameter $\sigma_A$. Thus, it follows that the performance of the proposed noise and phase jump detection method is insensitive to the value of $\sigma_A$ when applied to the pixels in the Condition I regions of the wrapped phase map 103. In addition to the ideal case of φ(i,j)=2π, φ(i+1, j)=0, φ(i,j+1)=2π, and φ(i+1,j+1)=0, the four neighboring pixels in the phase jump region of the wrapped phase map 103 may also have one phase value equal to 2π and three phase values equal to zero, or one phase value equal to zero and three phase values equal to 2π. However, in every case, the result S1(i, j)=S2(i, j)=S3(i, j)=S4(i, j)=0 is obtained. Therefore, pixels φ(i,j), φ(i+1, j), φ(i,j+1), and φ(i+1, j+1) in the region of the 2π phase jump are treated as continuous phase value pixels.

Characteristics of Condition II pixels: The four neighboring pixels shown in as shown in FIG. 2(*a*) are treated as continuous pixels if their phase values i.e. φ(i,j), φ(i+1, j), φ(i, j+1), and φ(i+1, j+1) are sufficiently close. That is, given the condition $0 \leq \sigma_A < \pi$, each of the four terms in S1, S2, S3 and S4 in Eq. (1) is equal to zero, i.e.

$$S1(i, j) = \left[\frac{\phi(i+1, j) - \phi(i, j) - \sigma_A}{2\pi}\right] \quad (3)$$

$$= \left[\frac{\phi(i+1, j+1) - \phi(i+1, j) + \sigma_A}{2\pi}\right]$$

$$= \left[\frac{\phi(i, j+1) - \phi(i+1, j+1) - \sigma_A}{2\pi}\right]$$

$$= \left[\frac{\phi(i, j) - \phi(i, j+1) + \sigma_A}{2\pi}\right]$$

$$= 0 (= S2(i, j) = S3(i, j) = S4(i, j))$$

The four terms in Eq. (3) are different from those in Eq. (2). Specifically, the four phase values in Eq. (3) are sufficiently close as to be continuous, while those in Eq. (2) are equal to either 2π or 0. The detection method treats the pixel (i, j) as noisy pixel if any one of S1, S2, S3 or S4 has a value other than zero. PD denotes the phase difference between any two neighboring continuous pixels at any position in the 2×2 area. In other words, PD=φ(i+1, j)−φ(i,j), φ(i+1, j+1)−φ(i+1, j), φ(i,j+1)−φ(i+1, j+1), or φ(i,j)−φ(i,j+1).

As a result, Eq. (3) can be further expressed as $$\left[\frac{PD - \sigma_A}{2\pi}\right] = \left[\frac{PD + \sigma_A}{2\pi}\right] = 0 \quad (4)$$

From Eq. (4), it follows that $$\frac{PD - \sigma_A}{2\pi} < \pm 0.5 \quad (5)$$

and $$\frac{PD + \sigma_A}{2\pi} < \pm 0.5 \quad (6)$$

Assuming that the condition $0 \leq \sigma_A = \pi$ holds, the intersection of Eqs. (5) and (6) yields $$|PD| < \pi - \sigma_A \quad (7)$$

Where $\pi - \sigma_A$ is the absolute maximum phase difference in the whole wrapped phase map 103.

In accordance with Eq. (7), if the absolute phase difference (|PD|) between any two neighboring pixels is less than $\pi - \sigma_A$, the noise and phase jump detection method yields S1(i,j)=S2 (i, j)=S3(i, j)=S4(i, j)=0, and pixel (i, j) is defined as a "good pixel". Conversely, if the absolute phase difference of any two neighboring pixels falls outside the range $\pi - \sigma_A$, more than one of S1, S2, S3 or S4 is not equal to zero, and thus pixel (i, j) is defined as a "bad pixel".

In summary, the noise and phase jump detection method given in Eq. (1) enables the 2π phase jump in the Condition I region of the wrapped phase map 103 to be retained irrespective of the value assigned to the threshold parameter $\sigma_A$, and treats the Condition II region of the wrapped phase map 103 as a continuous region if |PD| satisfies the constraint given in Eq. (7). The noise and phase jump detection method in Eq. (1) is applied to express two maps, namely "the noise map" and "the phase jump map". The noise map illustrates the noise positions where one of S1-S4 is not zero, and the phase jump map illustrates the positions where more than one path in S1(or S2-S4) is not equal to zero and the sum of four paths in S1 (or S2-S4) is zero. The threshold parameter, $\sigma_A$, is decided from Eq. (7), where the value of $\pi - \sigma_A$ is specified in accordance with the spatial resolution of the wrapped phase map 103.

In an exemplary embodiment, as shown in FIG. 2(*b*) only shows the straight phase regarding to the specific geometric shape. However, other cases, such as the curved or arbitrary phase can also be considered without departing from the scope of the present inventive concept.

Simulation results: The noise and phase jump detection method described by Eq. (1) detects three different types of noise, namely speckle noise, residual noise and the noise at the lateral surfaces of the height discontinuities in the wrapped phase map 103.

Figure 3A:
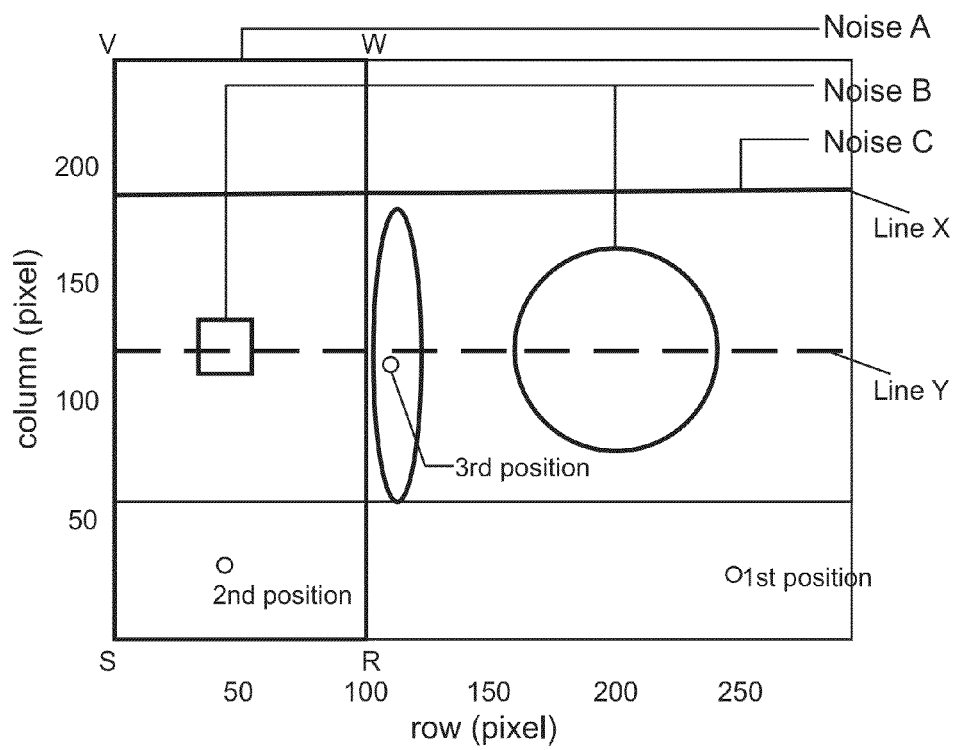
FIG. 3(a) is a graph showing the wrapped phase map containing speckle noise, residual noise and lateral surface noise at the points of height discontinuities.
Figure 3B:
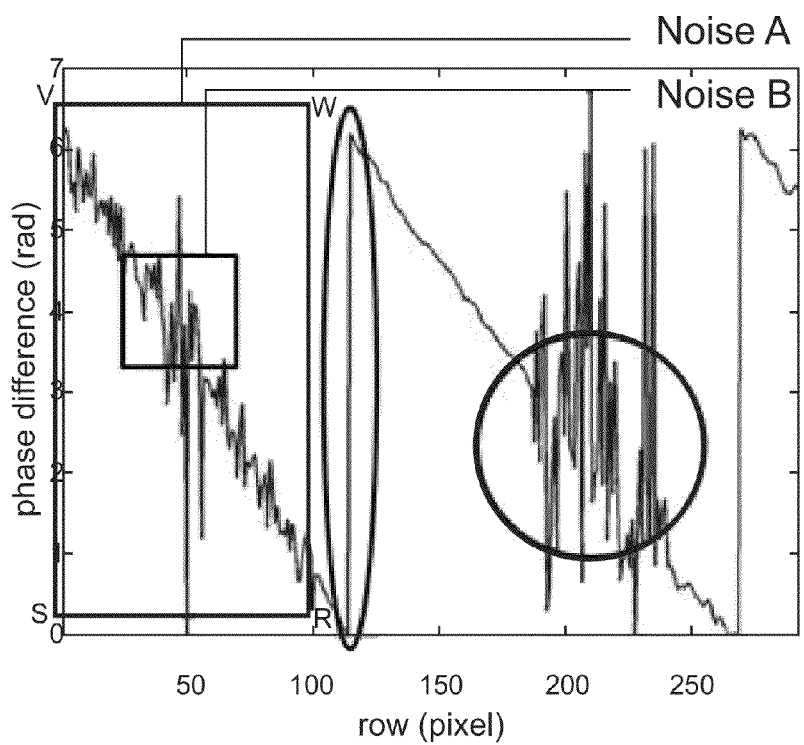
FIG. 3(b) is a graph showing the three-dimensional (3D) cross-sectional view of the wrapped phase map containing speckle noise, residual noise and lateral surface noise at the points of height discontinuities at a position corresponding to the 125th pixel column.

As shown in FIG. 3(*a*) and FIG. 3(*b*), the wrapped phase map 103 contains speckle noise (marked as "Noise A" within the rectangular region VWRS), residual noise (marked as "Noise B" within the square and circular regions), and lateral surface noise at the points of height discontinuities (marked as "Noise C" along the line X). FIG. 3(*b*) shows a 3D cross-sectional view of the wrapped phase map 103 shown in FIG. 3(*a*) at a position corresponding to the 125th pixel column (denoted by the horizontal dotted line Y in FIG. 3(*a*)). In FIG. 3(*a*) and FIG. 3(*b*), the ellipses indicate a region of a significant phase jump in the wrapped phase map 103. The following paragraphs describe the application of the noise and phase jump detection method to three different positions of the wrapped phase map 103 in FIG. 3(*a*), namely the 1st, 2nd, and 3rd positions.

Simulation Results on the 1st, 2nd, and 3rd positions by detection method: The 1st position of interest is that corresponding to the four pixels located at x=250 and 251 and y=25 and 26, respectively. From an inspection of FIG. 3(*a*), these four neighboring pixels are found to be non-turbulent, i.e. the four pixels have continuous phase values. The 2nd position of interest is located at x=45 and 46 and y=30 and 31. From inspection, these pixels are found to contain speckle noise, i.e. the four neighboring pixels have turbulent phase values. The 3rd position of interest is located at x=111 and 112 and y=122 and 123. As shown FIG. 3(a), these pixels fall within the region of the wrapped phase map 103 containing the phase jump. An inspection of the absolute phase values and spatial resolution FIG. 3(a) shows that the absolute-maximum phase difference, $\pi - \sigma_A$, is equal to 0.74, and thus the threshold parameter, $\sigma_A$, is assigned a value of 2.4 in each of the three regions of interest.

1st position (no turbulence): The phase values of the four neighboring pixels in the first position of interest are $\phi(250, 25)=4.3568$, $\phi(251,25)=4.3114$, $\phi(250,26)=4.4075$ and $\phi(251,26)=4.3552$ respectively. Thus, the terms in Paths 1, 2, 3 and 4 in S1 are as follows:

Path 1:
$$\left[\frac{\phi(i+1, j) - \phi(i, j) - \sigma_A}{2\pi}\right] = \left[\frac{\phi(251, 25) - \phi(250, 25) - \sigma_A}{2\pi}\right] = \left[\frac{4.3114 - 4.3568 - 2.4}{2\pi}\right] = 0 \quad (8)$$

Path 2:
$$\left[\frac{\phi(i+1, j+1) - \phi(i+1, j) + \sigma_A}{2\pi}\right] = \left[\frac{\phi(251, 26) - \phi(251, 25) + \sigma_A}{2\pi}\right] = \left[\frac{4.3552 - 4.3114 + 2.4}{2\pi}\right] = 0 \quad (9)$$

Path 3:
$$\left[\frac{\phi(i, j+1) - \phi(i+1, j+1) - \sigma_A}{2\pi}\right] = \left[\frac{\phi(250, 26) - \phi(251, 26) - \sigma_A}{2\pi}\right] = \left[\frac{4.4075 - 4.3552 - 2.4}{2\pi}\right] = 0 \quad (10)$$

Path 4:
$$\left[\frac{\phi(i, j) - \phi(i, j+1) + \sigma_A}{2\pi}\right] = \left[\frac{\phi(250, 26) - \phi(251, 26) + \sigma_A}{2\pi}\right] = \left[\frac{4.4075 - 4.3552 + 2.4}{2\pi}\right] = 0 \quad (11)$$

Paths 1, 2, 3 and 4 are all equal to zero. Furthermore, the absolute phase difference values between any two neighboring pixels, i.e. |PD|: |−0.0454|, |0.0438|, |0.0523|, and |□0.0507|, are less than $\pi = \sigma_{A=}0.74$ in every case. Therefore, the result satisfies Eq. (7) in (Condition II). Similarly, the four paths in S2~S4 are also equal to zero. Since the four pixels satisfy Eq. (7), and all four paths in S1, S2, S3 and S4 are equal to zero in every case, the noise and phase jump detection method identifies the pixels as "non-noisy" (i.e. continuous phase value) pixels.

2nd position (turbulent speckle noise): The phase values of the four neighboring pixels in the second position of interest are $\phi(43,33)=1.4545$, $\phi(44,33)=0.6497$, $\phi(43,34)=1.2163$ and $\phi(44,34)=0.5446$ respectively. In this case, Paths 1, 2, 3 and 4 in S1 are not all equal to zero, and therefore S1 has a value of □1. Furthermore, one of the four phase difference values between neighboring pixels (|PD|: |−0.8048|, |−0.1051|, |0.6717|, and |0.2382|) is greater than $\pi - \sigma_{A=}0.74$. As a result, the noise and phase jump detection method classifies the pixel (i, j) as the noisy pixel. If the phase difference values of the four neighboring pixels are very close to $\pi - \sigma_A$, S1 may fail to detect the noise. However, the noisy pixels will still be detected via the calculated results for S2~S4. Consequently, at least one of the four calculated results for S1~S4 enables the noise to be successfully detected.

3rd position (containing phase jump): The phase values of the four neighboring pixels in the third position of interest are $\phi(113,121)=0$, $\phi(114,121)=0.0070$, $\phi(113,122)=0$ and $\phi(114, 122)=6.2769$ respectively. In this case, in S1, Paths 1 and 4 are equal to zero, Path 2 is equal to 1; and Path 3 is equal to □1. Thus, S1 is equal to zero. Similarly, S2~S4 are also all equal to zero. Since, in S1, Path 2 and Path 3 are not equal to □zero, thus he noise and phase jump detection method detects a phase jump. As a result, the definition given by Condition I is satisfied, and hence the noise and phase jump detection method treats the four pixels as non-noisy pixels, i.e. the phase jump is retained.

Hence, the detection method not only passes the pixel at 1st position but also detects the speckle noise at 2nd position and retains the phase jumps at 3rd position.

Figure 4A:
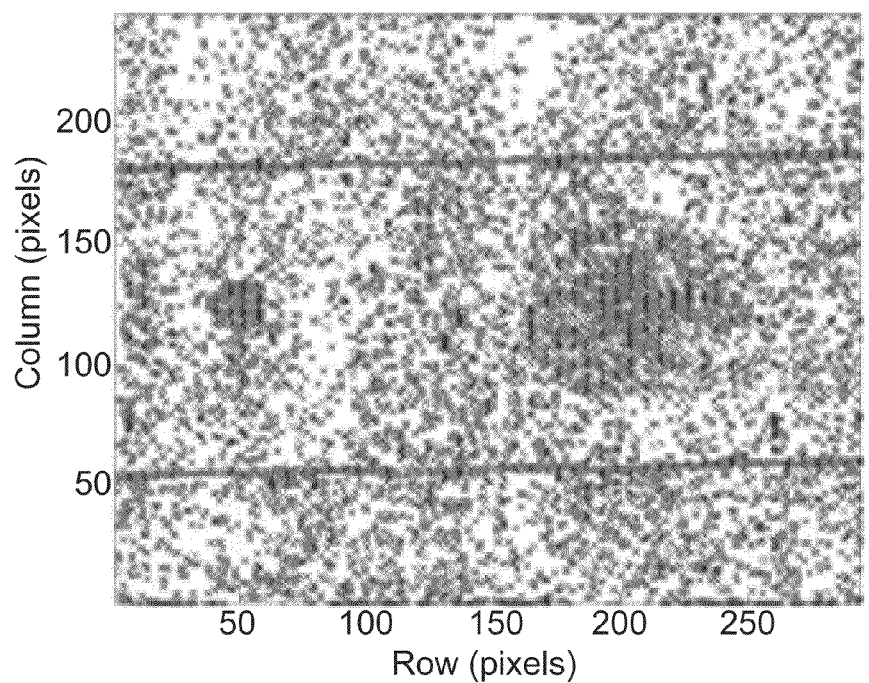
FIG. 4(a) is a graph showing the noise map obtained after application of the noise and phase detection scheme to the wrapped phase map containing speckle noise, residual noise and lateral surface noise at the points of height discontinuities.
Figure 4B:
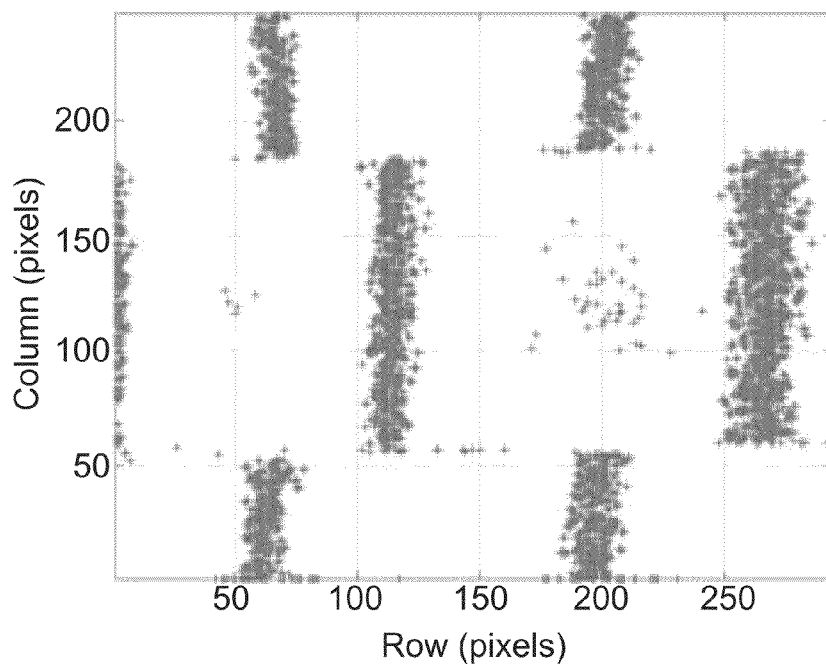
FIG. 4(b) is a graph showing the phase map obtained after application of the noise and phase detection scheme to the wrapped phase map containing speckle noise, residual noise and lateral surface noise at the points of height discontinuities.

FIG. 4(a) and FIG. 4(b) illustrate the noise map and the phase jump map respectively, obtained after application of the noise and phase detection scheme to the wrapped phase map 103.

Figure 5A:
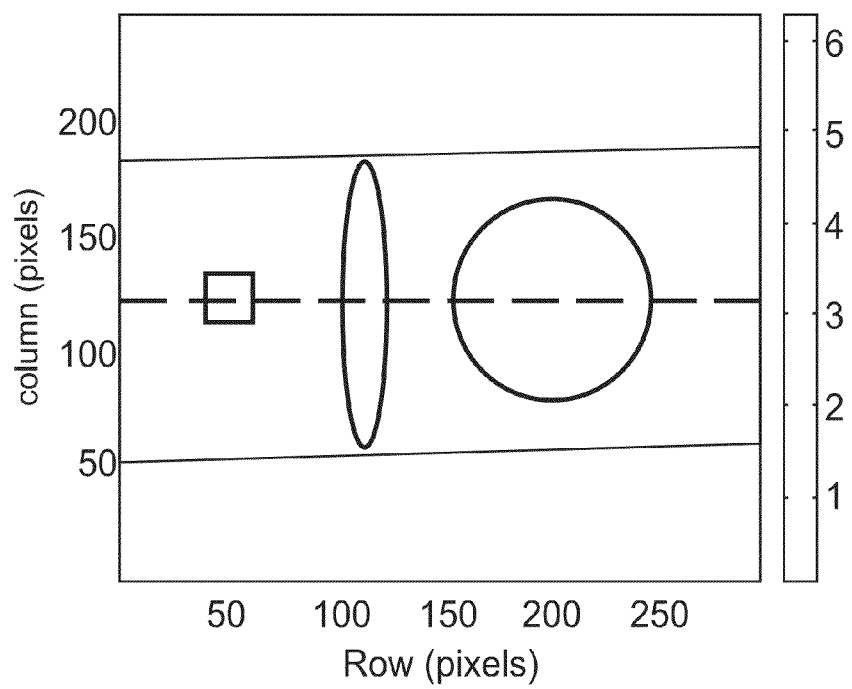
FIG. 5(a) is a graph showing the noise-reduced wrapped phase map obtained after application of the first filter twice.
Figure 5B:
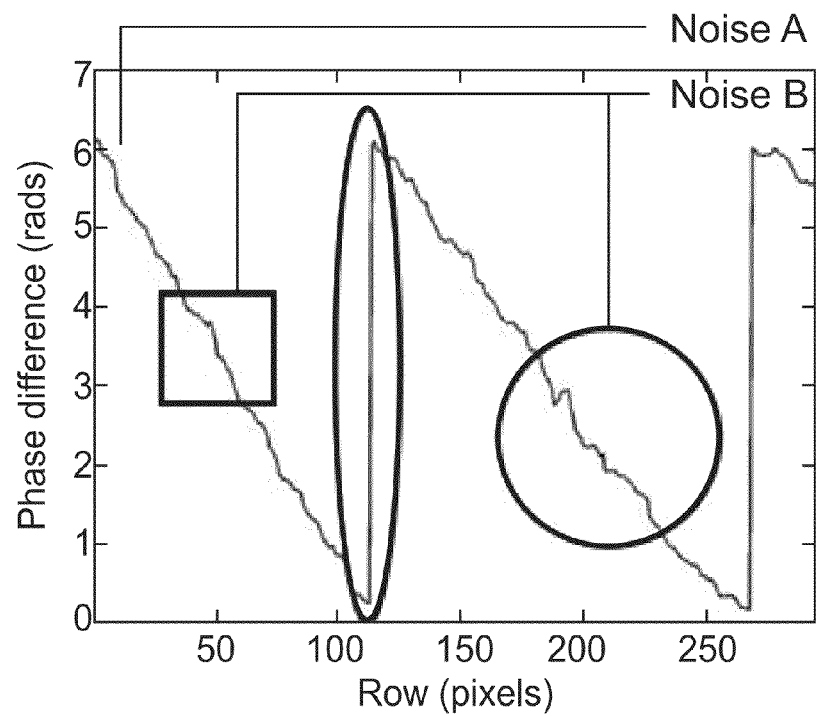
FIG. 5(b) is a graph showing the cross-section at column pixel 125 in the noise-reduced wrapped phase map.

The noise-reduced wrapped phase map 105 obtained after application of the first filter 104 twice is shown in FIG. 5(a). The cross-section at column pixel 125 in the noise-reduced wrapped phase map 130 from FIG. 5(a) is shown in FIG. 5(b). FIG. 5 (a) and FIG. 5(b) show that majority of the noise, Noise A (speckle noise) and Noise B (residual noise) in the wrapped phase map 103 is removed by the first filter 104 to obtain the noise-reduced wrapped phase map 105.

Figure 6A:
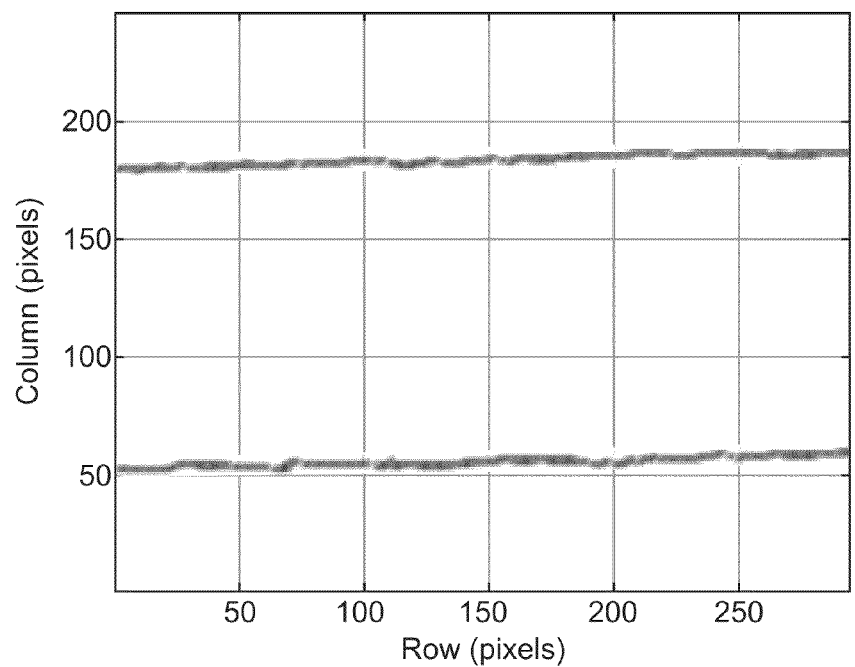
FIG. 6(a) is a graph showing the noise map obtained after application of the first filter twice.
Figure 6B:
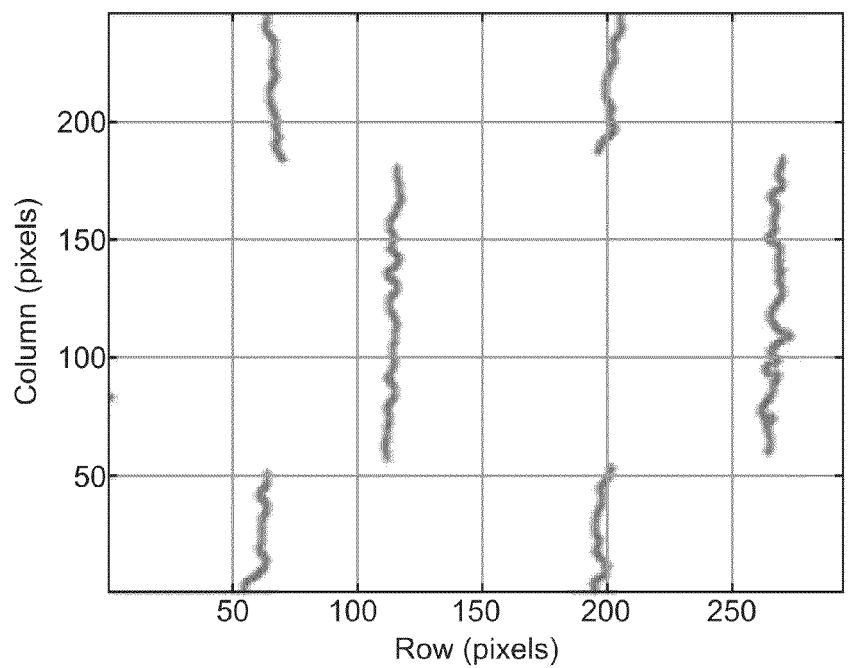
FIG. 6(b) is a graph showing the phase map obtained after application of the first filter twice.

The noise map and the phase jump map obtained after application of the first filter 104 twice are shown in FIG. 6(a) and FIG. 6(b) respectively. These figures show that the first filter 104 removes a majority of the noise, speckle noise and residual noise in the wrapped phase map 103. The noise missed by the first filter 104 is located at the lateral surface of height discontinuities (Noise C).

In an exemplary embodiment, The noise-reduced wrapped phase map 105 can be unwrapped along a path described in the following sub-sections as Path I.

In another exemplary embodiment, The noise-reduced wrapped phase map 105 can be unwrapped along another path described in the following sub-sections as Path II.

In yet another exemplary embodiment, the noise-reduced wrapped phase map 105 can be unwrapped along yet another path described in the following sub-sections as Path III.

Figure 7:
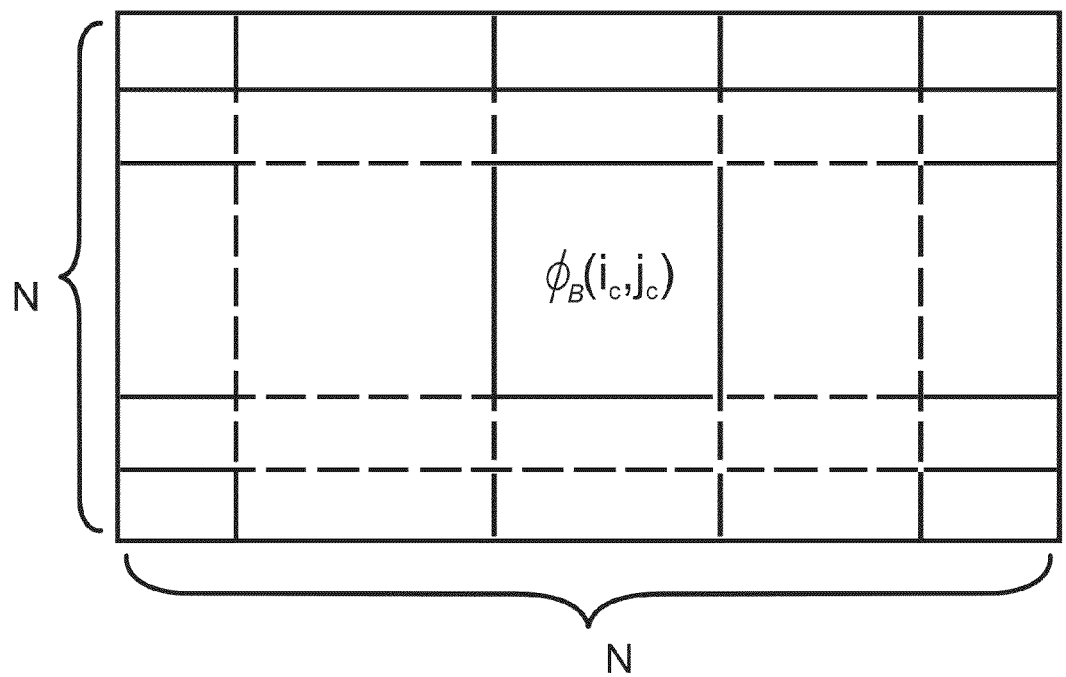
FIG. 7 is a diagram showing N×N mask used in the second filter and the third filter during phase unwrapping process.

Path I: After filtering the wrapped phase map 103 by the first filter 104, the noise-reduced wrapped phase map 105 is obtained which is then unwrapped in row direction by the path-dependent MACY algorithm 106. The obtained map is further filtered by the second filter 107 to remove any noise (especially on height discontinuities) missed by the first filter 104 or row-unwrapping error or both. The second filter 107 replaces detected noise with the median phase value of an N×N mask centered on the noise. As shown in FIG. 7, the noise-reduced wrapped phase map 105 is processed pixel-by-pixel using a sliding N×N mask with its center located at the pixel of interest, i.e., pixel ($i_c$, $j_c$). The phase unwrapping procedure commences by marking the individual pixels within the noise-reduced wrapped phase map 105 as either good or bad using the detection method given by Eq. (1). In the subsequent filtering operation, the phase of any pixel identified as a good pixel and having a deviation of less than $\sigma_g$ from its expected phase value is left unchanged. Conversely, for any pixel erroneously identified as a good pixel (i.e., the deviation of the actual phase value of the pixel from the expected phase value is greater than $\sigma_g$), the phase value of the pixel is automatically replaced by the expected phase value. Finally, the phase values of all pixels marked as bad by the detection scheme are replaced by the median value of the good pixels within the mask. After application of the second filter 107, the noise-reduced wrapped phase map 105 is unwrapped in column direction and is filtered by the third filter 108 to obtain the unwrapped phase map 109. The third filter 108 removes noise (especially on height discontinuities) missed by the first filter 104 or column-unwrapping error or both.

Figure 8A:
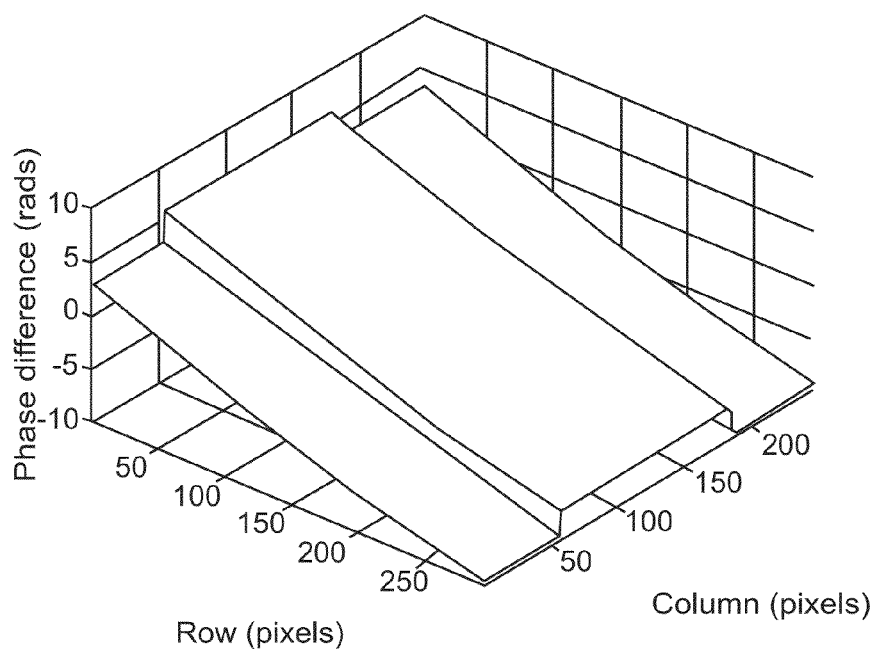
FIG. 8(a) is a graph showing the unwrapping results along path I with G=20.
Figure 8B:
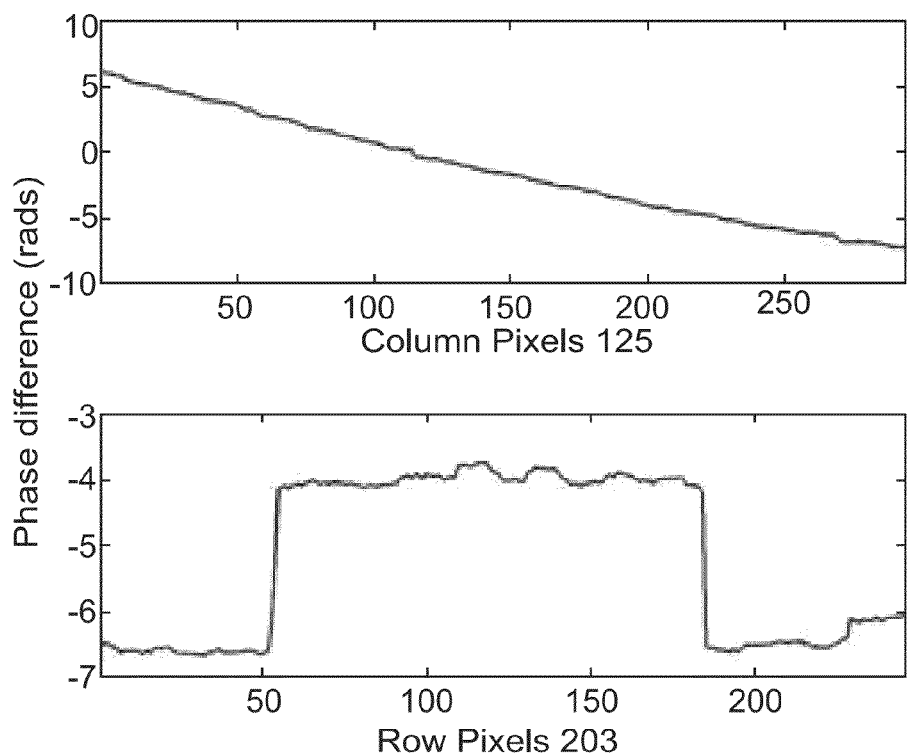
FIG. 8(b) is a graph showing the cross-section of the unwrapped phase obtained by unwrapping of noise-reduced wrapped phase map along path I at column pixel 125 and row pixel 203, respectively.

The unwrapped phase map 109 obtained by unwrapping of noise-reduced wrapped phase map 105 along path I is illustrated in FIG. 8(*a*). Two cross-sections straddle the corresponding circular center of Noise B (residual noise), which are at column pixel 125 and row pixel 203, as shown in FIG. 8(*b*). The phase difference of the height discontinuity is about 2.5 rad. FIG. 8(*a*) and FIG. 8(*b*) show that the image reconstruction of the 3D object containing height discontinuities is successful.

Figure 9:
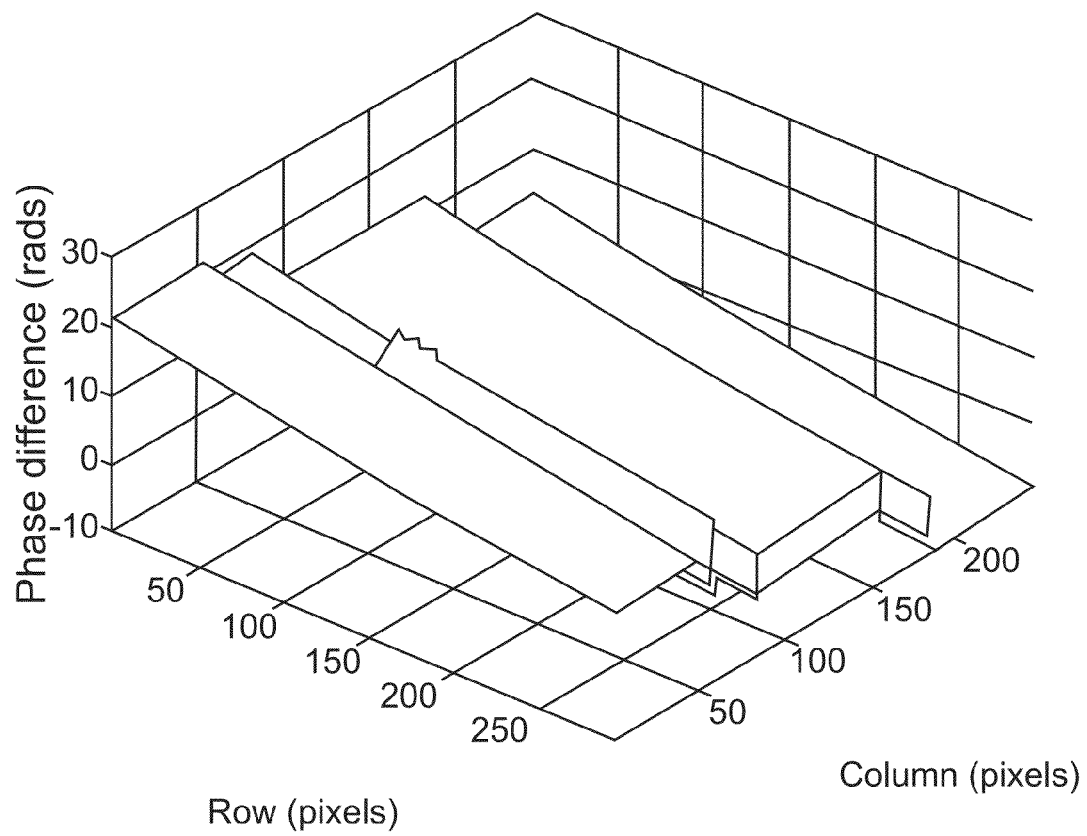
FIG. 9 is a graph showing the unwrapping results without the second filter and with the same parameters as those used for Path I.

To demonstrate the function of the second filter 107, Path I without the second filter 107 is simulated. For the same parameters, the unwrapping results are illustrated in FIG. 9.

Path II: After filtering the wrapped phase map 103 by the first filter 104, the noise-reduced wrapped phase map 105 is obtained which is then unwrapped by path-independent CA algorithm 110. In the path-independent phase unwrapping algorithm 110, all the possible unwrapping paths between two pixels are sought. The noise-reduced wrapped phase map 105 is unwrapped using the cycles of local iterations 111 and global iterations 112. The second filter 113 is repeatedly used after each cycle of the local iteration 111 and the global iteration 112. After completion of these cycles, the third filter 114 filters noise missed by the first filter 105 (especially those on height discontinuities) to obtain the unwrapped phase map 115.

Figure 10:
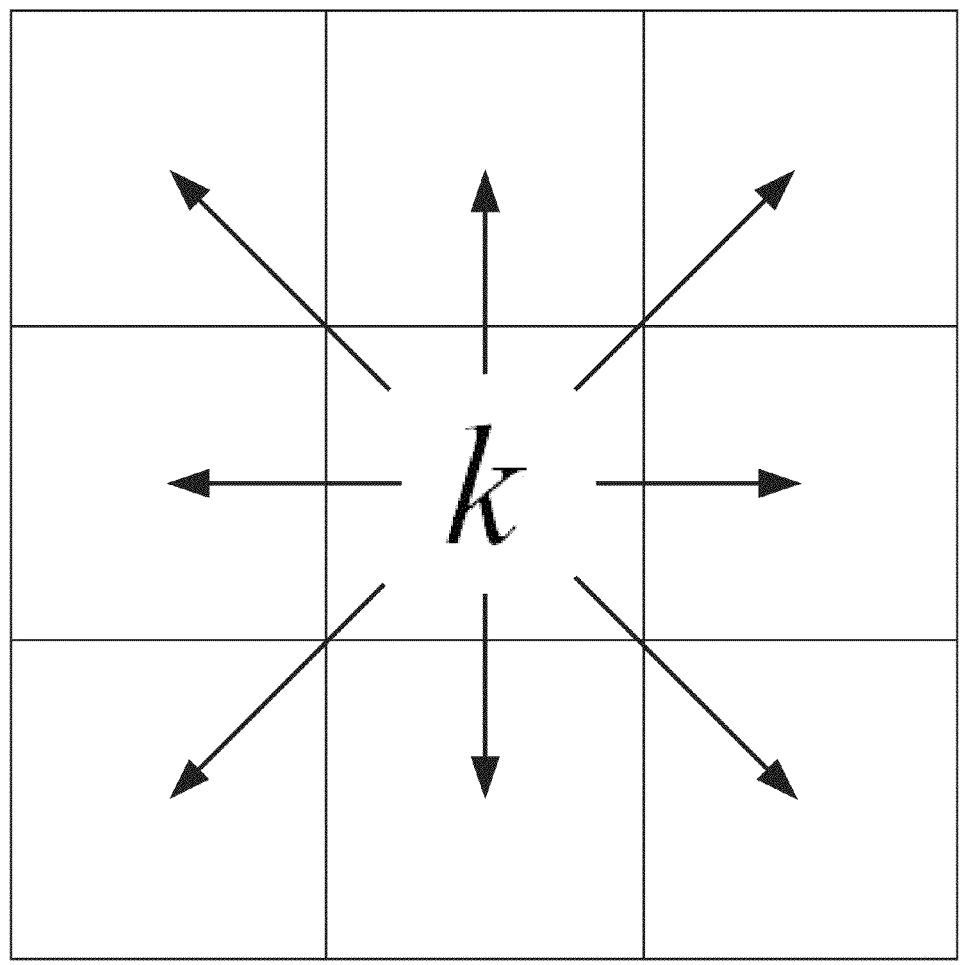
FIG. 10 is a diagram showing a pixel of the noise-reduced wrapped phase map with its eight neighboring pixels.

The local iteration 111 considers each pixel with its eight neighboring pixels of the noise-reduced wrapped phase map 105 as shown in FIG. 10. In order to obtain one unit which is the phase difference of $\pi$, every pixel is calculated with one of neighboring eight pixels i.e.

$$\text{fix}\left|\frac{p(x, y) - p(x - i, \sqrt{y} - j)}{\pi}\right|,$$

When the phase difference between one pixel and one of itself neighboring pixel is greater than $\pi$, one unit is added to the phase value of the pixel. Finally, the continuous phase value is obtained. The equation of the local iteration is as follows:

$$p(x, y)' = p(x, y) + 2\pi * \text{sign}(k) \quad (12)$$

$$k = \sum_{ij} \text{fix}\left(\frac{p(x, y) - p(x - i, y - j)}{\pi}\right)$$

$$i, j = 0, \text{ or } \pm 1$$

Where p(x, y) is the phase value of center position (x, y), fix(A) indicates an operation that rounds the elements of A toward zero, resulting in an array of integers, (x−i, y−j) is the neighboring position of the phase value and sign( ) is the operation of recording plus or minus symbols. The rule of the local iteration (111,117) is: If k is positive, the operation of sign(k) will be equal to the value of 1. From Eq. (12), the phase value of the center position plus $2\pi$ will become the new phase value, p(x, y)'. If k is negative, the operation of sign(k) will be equal to the value of −1. From Eq. (12), the phase value of the center position minus $2\pi$ will become the new phase value, p(x, y)'. If the terms in k are not equal to zeros and the sum of all terms in k is equal to zero, sign(k) will be equal to zero. From Eq. (12), the phase value of the center position plus $2\pi$ will become the new phase value, p(x, y)'. If the terms in k are equal to zeros, sign(k) will be equal to zero. From Eq. (12), the phase value of the center position will be equal to the new phase data, p(x, y)'. After the original phase matrix is calculated by the rule of the local iteration (111,117) again and again, finally the oscillating matrix is obtained. The oscillating matrix is robust oscillation with two cycles, called as $T_1$ and $T_2$. The global iteration (112,118) is the process which averages two robust-oscillating matrixes of T1 and T2.

Figure 11A:
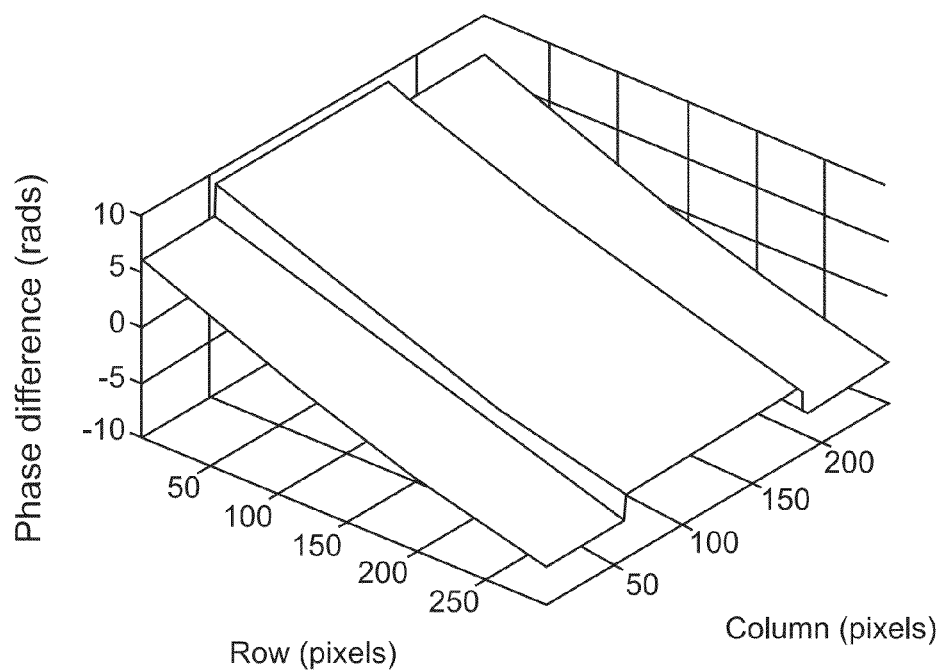
FIG. 11(a) is a graph showing the unwrapping results along path II with G=20.
Figure 11B:
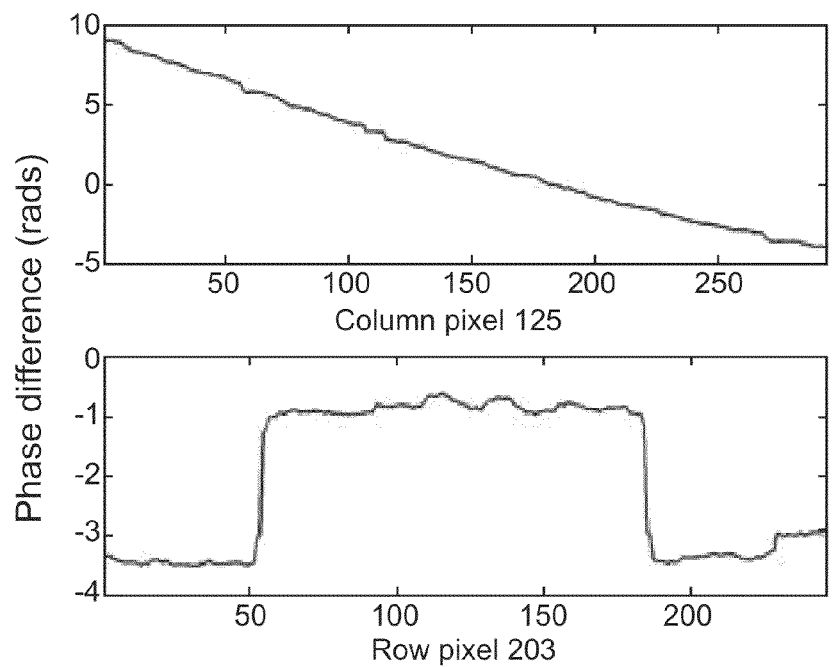
FIG. 11(b) is a graph showing the cross-section of the unwrapped phase obtained by unwrapping of noise-reduced wrapped phase map along path II at column pixel 125 and row pixel 203, respectively.

FIG. 11(*a*) presents the unwrapping results of Path II, which uses the first filter 104, the second filter 113 and the path-independent CA algorithm 110 for unwrapping the wrapped phase map 103. The cross-sections at column pixel 125 and row pixel 203 are shown in FIG. 11(*b*). FIG. 11(*a*) and FIG. 11(*b*) show that the second filter 113 removes the noise at the lateral surface of height discontinuities and therefore enables the path-independent CA algorithm 110 to converge.

Figure 12:
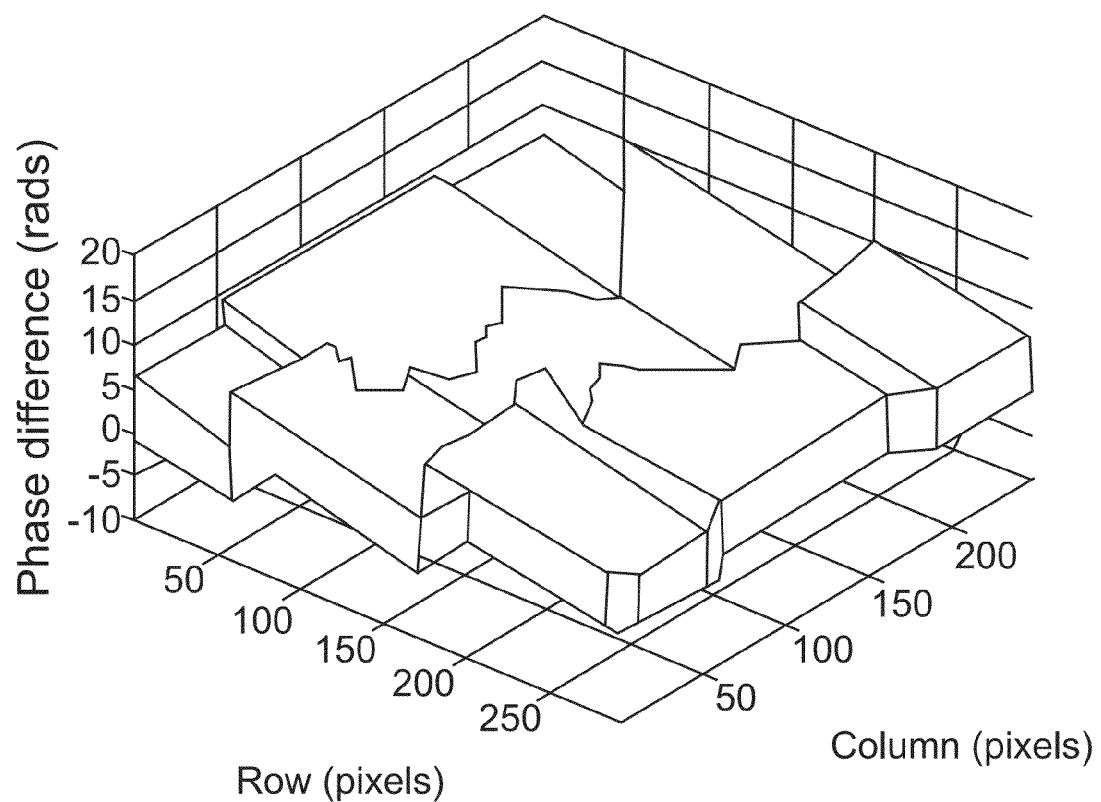
FIG. 12 is a graph showing the unwrapping results without the second filter and with the same parameters as those used for Path II.

To demonstrate the function of the second filter 113, Path II without the second filter 113 is simulated. For the same parameters, the unwrapping results without the second filter 113 are illustrated in FIG. 12.

Path III: After filtering the wrapped phase map 103 by the first filter 104, the noise-reduced wrapped phase map 105 is obtained which is then unwrapped by the path-independent CA algorithm 110. The noise-reduced wrapped phase map 105 is first cut into several sub-maps 116 and then an additional area is added to each sub-map 116 to improve the stitching error of array processor and hence, improve the quality of unwrapped results. Each sub-map 116 is unwrapped using cycles of local iterations 117 and global iterations 118. The second filter 119 is repeatedly used after each cycle of the local iteration 117 and the global iteration 118. After unwrapping, all the sub-maps 116 are meshed together and then filtered by the third filter 120 to obtain noise-removed unwrapped phase map (or image reconstruction) 121. The third filter 120 is used to remove any noise missed by the first filter 105, especially those at height discontinuities.

Figure 13A:
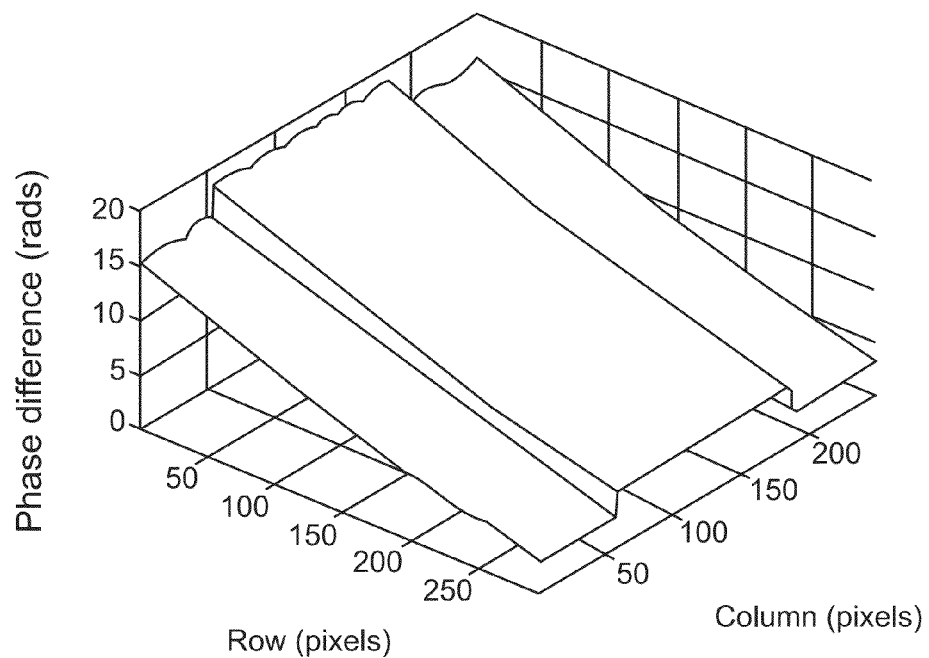
FIG. 13(a) is a graph showing the unwrapping results along path III with G=20.
Figure 13B:
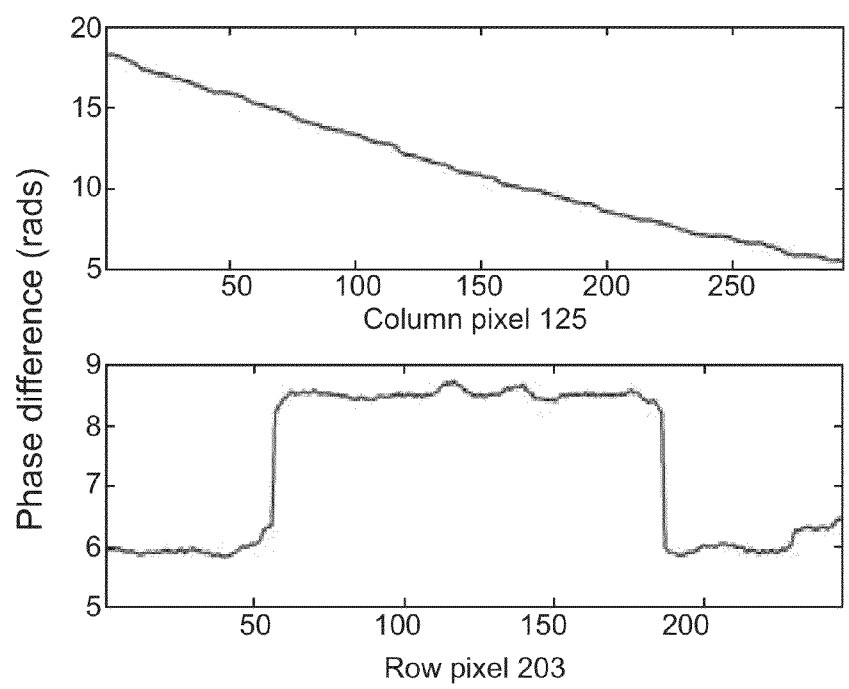
FIG. 13(b) is a graph showing the cross-section of the unwrapped phase obtained by unwrapping of noise-reduced wrapped phase map along path III at column pixel 125 and row pixel 203, respectively.

FIG. 13(*a*) shows the results of image reconstruction for Path III with the additional area. FIG. 13(*b*) shows the cross-sections at column pixel 125 and row pixel 203. The phase difference of height discontinuities is about 2.5 rad. The results show that the unwrapping is successful.

The simulations of the proposed method have been performed using MATLAB software on a PC equipped with an AMD Athlon™ 64×2 4400+2.31 GHz dual-core processor and 2 GB of RAM. The five simulated interferograms of height discontinuities have been produced using MATLAB software and then converted into a single raw wrapped phase map with dimensions of 294×246 pixels (rows x columns). The following three types of noise have been produced. Speckle noise, namely Noise A, has been generated using the "imnoise" function in MATLAB with an intensity parameter setting of 0.08, written as "imnoise (each of five interferograms, 'speckle', 0.08)." Residual noise, namely Noise B, has been produced by the "imnoise" function using the salt and pepper noise with an intensity parameter setting of 0.35, written as "imnoise (each of five interferograms, 'salt & pepper', 0.35)"; it mimics the effects of dust or some other form of environmental contamination. Finally, noise at the lateral surface of height discontinuities, namely Noise C, has been produced by the written program which considers not only the signal at the low and high positions of discontinuities but also the same function of Noise B with an intensity parameter setting of 0.01; it generates constraint effects on the depth of field and diffraction limit.

While the exemplary embodiments have been disclosed for illustrative purposes, those skilled in the art will appreciate that various modifications and other embodiments are possible, without departing from the scope and spirit of the present inventive concept as defined by the appended claims

We claim:

1. A method for removing speckle noise, residual noise and noise at lateral surface of height discontinuities in an image reconstruction, wherein said method comprises:
   generating interferograms of an object image;
   generating a wrapped phase map of said object image from said interferograms by application of a phase-shift algorithm, wherein said wrapped phase map contains said speckle noise, said residual noise and said noise at lateral surface of height discontinuities;
   detecting said speckle noise, said residual noise and said noise at lateral surface of height discontinuities and filtering said speckle noise and said residual noise from said wrapped phase map by a first filter, thereby obtaining a noise-reduced wrapped phase map;
   unwrapping said noise-reduced wrapped phase map in row direction by a path-dependent phase unwrapping algorithm;
   filtering phase map obtained from application in said row direction of said path-dependent phase unwrapping algorithm by a second filter;
   unwrapping phase map obtained from said second filter in column direction by said path-dependent phase unwrapping algorithm; and
   filtering phase map obtained from application in said column direction of said path-dependent phase unwrapping algorithm by a third filter, thereby obtaining an unwrapped phase map, wherein said unwrapped phase map is free from said speckle noise, said residual noise and said noise at lateral surface of height discontinuities.

2. The method of claim 1 wherein said phase-shift algorithm is three-frame phase-shift algorithm.

3. The method of claim 1 wherein said phase-shift algorithm is four-frame phase-shift algorithm.

4. The method of claim 1 wherein said phase-shift algorithm is Carre' algorithm.

5. The method of claim 1 wherein said phase-shift algorithm is five-frame phase-shift algorithm.

6. The method of claim 1 wherein said first filter is an adaptive median filter based on noise and phase jump detection.

7. The method of claim 1 wherein said path-dependent phase unwrapping algorithm is MACY algorithm.

8. The method of claim 1 wherein said second filter removes either or combination of said speckle noise, said residual noise, said noise at lateral surface of height discontinuities and row-unwrapping error missed by said first filter.

9. The method of claim 1 wherein said third filter removes either or combination of said speckle noise, said residual noise, said noise at lateral surface of height discontinuities and column-unwrapping error missed by said first filter.

10. A method for removing speckle noise, residual noise and noise at lateral surface of height discontinuities in an image reconstruction, wherein said method comprises
   generating interferograms of an object image;
   generating a wrapped phase map of said object image from said interferograms by application of a phase-shift algorithm, wherein said wrapped phase map contains said speckle noise, said residual noise and said noise at lateral surface of height discontinuities;
   detecting said speckle noise, said residual noise and said noise at lateral surface of height discontinuities and filtering said speckle noise and said residual noise from said wrapped phase map by a first filter, thereby obtaining a noise-reduced wrapped phase map;
   unwrapping said noise-reduced wrapped phase map by a path-independent phase unwrapping algorithm using cycles of local and global iterations, wherein a second filter is used repeatedly after each cycle of said local and global iterations; and
   filtering phase map obtained after completion of said cycles by a third filter, thereby obtaining an unwrapped phase map, wherein said unwrapped phase map is free from said speckle noise, said residual noise and said noise at lateral surface of height discontinuities.

11. The method of claim 10 wherein said phase-shift algorithm is three-frame phase-shift algorithm.

12. The method of claim 10 wherein said phase-shift algorithm is four-frame phase-shift algorithm.

13. The method of claim 10 wherein said phase-shift algorithm is Carre' algorithm.

14. The method of claim 10 wherein said phase-shift algorithm is five-frame phase-shift algorithm.

15. The method of claim 10 wherein said first filter is an adaptive median filter based on noise and phase jump detection.

16. The method of claim 10 wherein said path-independent phase unwrapping algorithm is cellular automata (CA) algorithm.

17. The method of claim 10 wherein said second filter removes either or combination of said speckle noise, said residual noise, said noise at lateral surface of height discontinuities and row-unwrapping error missed by said first filter.

18. The method of claim 10 wherein said third filter removes either or combination of said speckle noise, said residual noise, said noise at lateral surface of height discontinuities and column-unwrapping error missed by said first filter.

19. A method for removing speckle noise, residual noise and noise at lateral surface of height discontinuities in an image reconstruction, wherein said method comprises:
   generating interferograms of an object image;
   generating a wrapped phase map of said object image from said interferograms by application of a phase-shift algorithm, wherein said wrapped phase map contains said speckle noise, said residual noise and said noise at lateral surface of height discontinuities;
   detecting said speckle noise, said residual noise and said noise at lateral surface of height discontinuities and filtering said speckle noise and said residual noise from said wrapped phase map by a first filter, thereby obtaining a noise-reduced wrapped phase map;
   cutting said noise-reduced wrapped phase map into several sub-maps and adding an additional area to each of said sub-maps;
   unwrapping sub-maps obtained by adding said additional area to said sub-maps by a path-independent phase unwrapping algorithm using cycles of local and global iterations, wherein a second filter is used repeatedly after each cycle of said local and global iterations;

stitching together phase unwrapped sub-maps obtained by unwrapping of said sub-maps after completion of said cycles; and filtering phase map obtained after stitching together said phase unwrapped sub-maps by a third filter, thereby obtaining an unwrapped phase map, wherein said unwrapped phase map is free from said speckle noise, said residual noise and said noise at lateral surface of height discontinuities.

20. The method of claim 19 wherein said phase-shift algorithm is three-frame phase-shift algorithm.

21. The method of claim 19 wherein said phase-shift algorithm is four-frame phase-shift algorithm.

22. The method of claim 19 wherein said phase-shift algorithm is Carre' algorithm.

23. The method of claim 19 wherein said phase-shift algorithm is five-frame phase-shift algorithm.

24. The method of claim 19 wherein said first filter is an adaptive median filter based on noise and phase jump detection.

25. The method of claim 19 wherein said path-independent phase unwrapping algorithm is cellular automata (CA) algorithm.

26. The method of claim 19 wherein said second filter removes either or combination of said speckle noise, said residual noise, said noise at lateral surface of height discontinuities and row-unwrapping error missed by said first filter.

27. The method of claim 19 wherein said third filter removes either or combination of said speckle noise, said residual noise, said noise at lateral surface of height discontinuities and column-unwrapping error missed by said first filter.

* * * * *